United States Patent [19]
Harding

[11] 3,932,925
[45] Jan. 20, 1976

[54] METHOD OF MAKING CHEMICAL TOILET CABANA

[75] Inventor: George W. Harding, Warren, Mich.

[73] Assignee: Poly-San Corporation, Sarasota, Fla.

[22] Filed: July 31, 1974

[21] Appl. No.: 493,256

Related U.S. Application Data

[62] Division of Ser. No. 378,316, July 11, 1973, Pat. No. 3,835,480.

[52] U.S. Cl. .................... 29/428; 29/416; 264/152
[51] Int. Cl.² ................... B21D 39/03; B23P 11/00
[58] Field of Search ...... 29/412, 416, 428; 264/152; 4/2, 3, 4, 115, 116, 119; 52/79

[56] References Cited
UNITED STATES PATENTS

| | | | |
|---|---|---|---|
| 3,389,670 | 6/1968 | Caple | 29/416 X |
| 3,447,167 | 6/1969 | Harding | 4/116 |
| 3,540,113 | 11/1970 | Krutzkowsky | 29/428 X |
| 3,750,353 | 8/1973 | Smith, Jr. | 52/80 |
| 3,848,309 | 11/1974 | Nuss | 29/416 X |

Primary Examiner—Victor A. DiPalma
Attorney, Agent, or Firm—Cullen, Settle, Sloman & Cantor

[57] ABSTRACT

A chemical toilet cabana comprising a plurality of initially identical shell sections, each having a dome-like roof, side walls terminating in a bell-like enlarged lower end and a base flange extending outwardly from the enlarged lower end of the side wall. The base flange is removed from a first shell section to form a cabana top. The dome-like roof is removed from a second shell section to form a cabana base and both the dome-like roof and the base flange are removed from other shell sections to form intermediate cabana shell members. The sections are stacked one upon the other with the wall of a section fitted within the enlarged lower end of the section immediately thereabove and with the walls of the sections substantially in vertical alignment. The base flange of the bottom section is fastened to a base skid which includes a filler material for weight and stability of the cabana.

5 Claims, 11 Drawing Figures

U.S. Patent   Jan. 20, 1976   Sheet 1 of 2   3,932,925
FIG.1
FIG.2
FIG.3
FIG.4
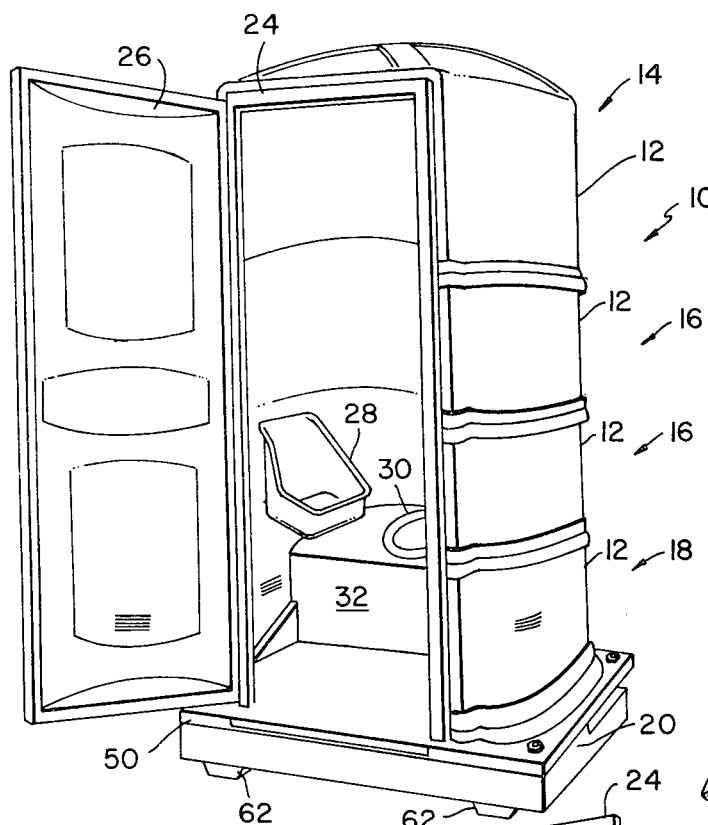
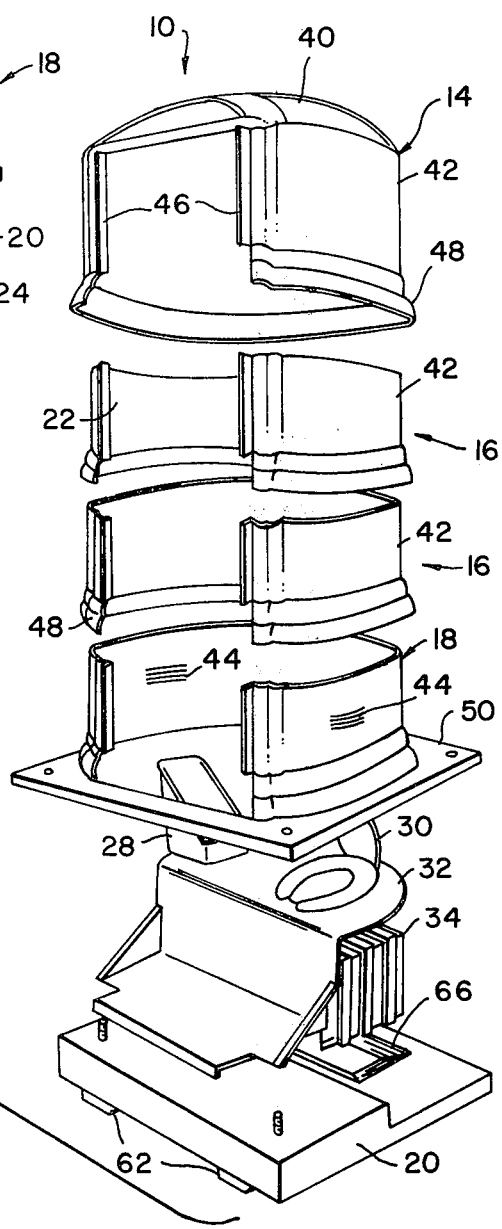
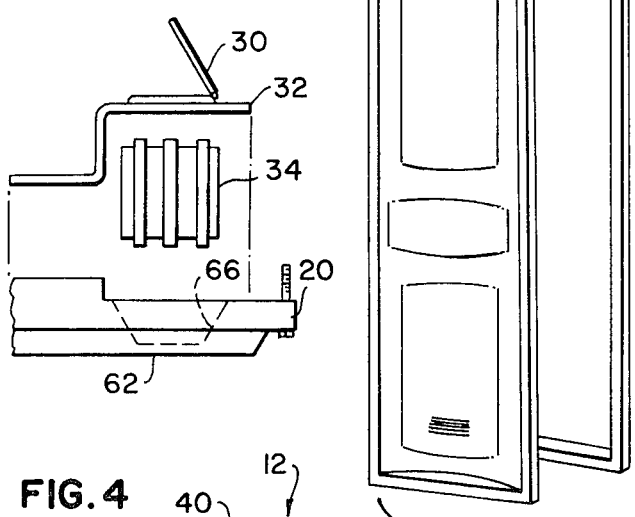
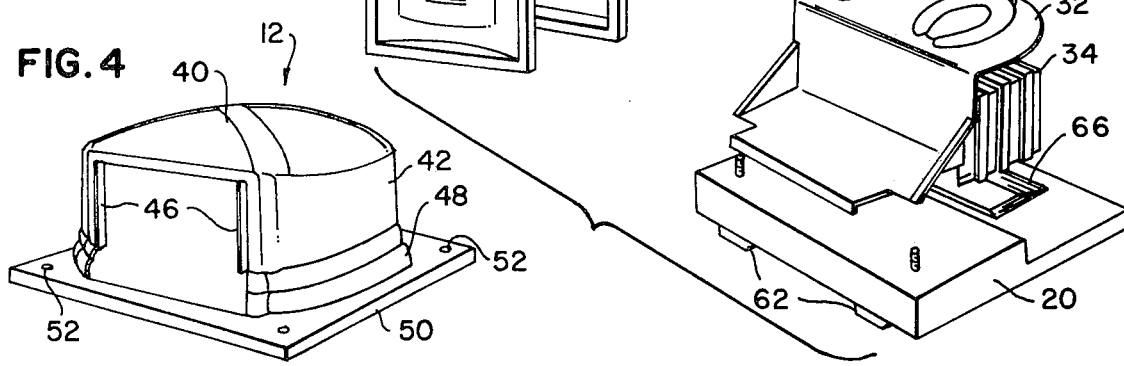

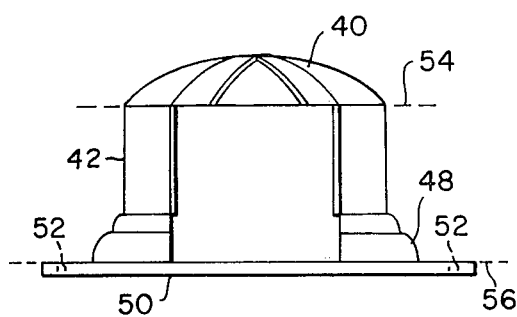
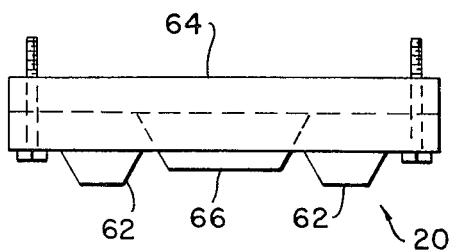
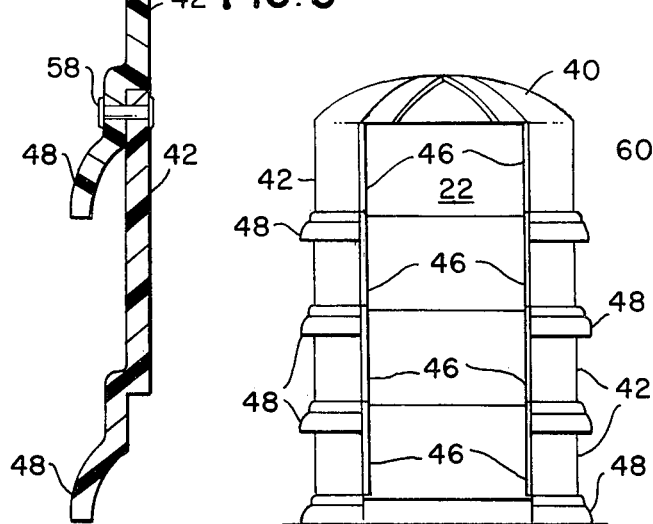
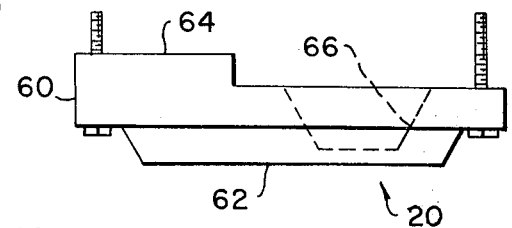
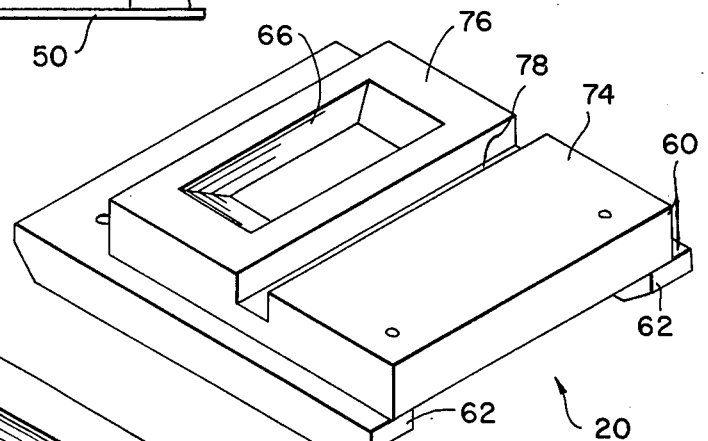
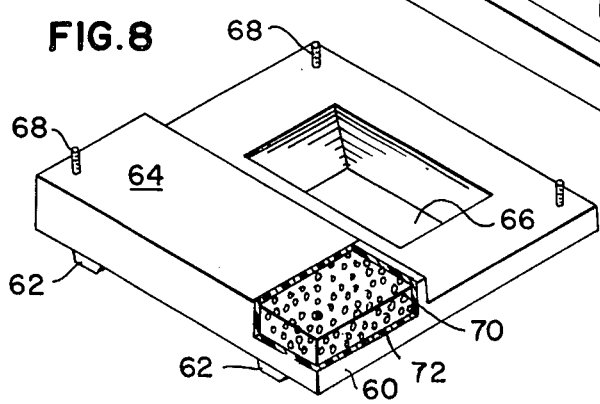

METHOD OF MAKING CHEMICAL TOILET CABANA

This is a division of application Ser. No. 378,316 filed July 11, 1973, now U.S. Pat. No. 3,835,480.

BACKGROUND OF THE INVENTION

The invention herein relates to outdoor chemical-type toilet cabanas such as that illustrated in the patent to Harding, U.S. Pat. No. 3,447,167 of June 3, 1969. Chemical toilets used, for example, at construction and recreation sites, have been made of a unitary wood or plastic cabana structure containing toilet facilities. These structures are quite heavy and thus, difficult to transport or ship from the place of manufacture to the ultimate place of use. Moreover, they are difficult to clean and to repair when damaged.

Where relatively lightweight plastic cabanas are used, such as set forth in the above U.S. Pat. No. 3,447,167, other problems arise, because these cabanas provide insufficient stability, thus requiring an extremely heavy support base which increases the weight, cost, and difficulty of shipping. In addition, the cost of molding the many required parts, including the costs of the molds, is substantial, as is the cost of stocking numerous parts for replacement of damaged parts.

Thus, the invention herein relates to a relatively inexpensive, plastic molded, chemical toilet cabana which is easily transportable, is formed of relatively few parts, and is easily assembled.

SUMMARY OF THE INVENTION

The invention herein relates to a chemical toilet cabana formed of a plurality of initially identical shell sections each having a dome-like roof, side walls terminating in a bell-like enlarged lower end, and a base flange extending outwardly from the bell-like lower end of the side wall. Each of these sections may be initially molded from the same mold.

Thereafter, the base flange is removed from a first section to form the top for a toilet cabana. The dome-like roof is removed from a second section to form the bottom of the cabana, and both the dome-like roof and the base flange are removed from other sections to form intermediate sections of the cabana. The various sections are stacked one upon the other with the wall of a given section fitting within the enlarged bell-like lower end of the section thereabove and with the side walls of all the sections being substantially in vertical alignment.

The base flange of the bottommost section is connected to a base skid which may be in the form of a metal or plastic plan filled with an aggregate material for weight and covered over with a material, such as a foam plastic, which forms an interior surface for the cabana floor. The side walls of the bottommost shell section has a plurality of vent slots formed therein at the upper edge of the shell to provide for adequate ventilation.

When the sections are stacked one upon the other, they may be riveted together and the bell-like enlarged lower ends provide not only a riveting surface for all sections but also act as a louver to prevent water, such as rainwater, from entering the slots of the bottommost section.

These and other objects and advantages of the present invention will become apparent upon reading the following description taken in conjunction with the drawings.

BRIEF DESCRIPTION OF THE DRAWINGS

In the drawings, wherein like reference numerals identify corresponding parts:

FIG. 1 is a perspective illustration of a chemical toilet cabana according to the principles of the present invention;

FIG. 2 is an exploded perspective illustration of the chemical toilet cabana of FIG. 1;

FIG. 3 is a partial exploded view illustrating the seat, chemical tank and base support for the cabana of FIGS. 1 and 2;

FIG. 4 is a perspective illustration of a single cabana shell section;

FIG. 5 is a front elevation of a single cabana shell section showing the planes through which the top and-/or bottom may be removed;

FIG. 6 is an illustration of the stacking and joining of two vertical sections;

FIG. 7 is an illustration of a plurality of sections joined together to form a complete shell;

FIG. 8 is a perspective illustration, partly broken away, of the base skid of the present invention;

FIG. 9 is a front elevation view of the skid of FIG. 7;

FIG. 10 is a side elevation of the base skid of FIG. 7; and

FIG. 11 is a perspective illustration of another embodiment of the base skid of the present invention.

DETAILED DESCRIPTION OF THE INVENTION

The chemical toilet cabana 10 of the present invention is formed of a plurality of initially identical shell sections 12 including a top section 14, a plurality of intermediate sections 16 and a bottom section 18. The bottom section 18 is secured to a base skid 20.

The wall of each section has a cut-out or opening 22 into which a molded frame 24 may be attached. A door 26 may be fastened to the frame 24 such as by hinges. The inside of the chemical toilet cabana may include a urinal 28, and a toilet 30 which may be part of a seat unit 32. As illustrated in greater detail in FIGS. 2 and 3, a chemical holding tank 34 may be provided beneath the toilet 30.

With respect to FIGS. 4–7, each individual shell section 12, which may be molded of plastic or the like, initially includes a dome 40, side walls 42 and front flanges 46 to which the door frame 24 may be secured.

The side walls 42 terminate at their lower end in a bell-like enlarged portion or louver 48 and each section includes a base flange 50 which extends outwardly in all directions from the bell-like enlarged end 48. In the base flange 50 there are a plurality of holes 52 through which bolts may be inserted for securing the bottommost section to the base skid 20.

Each of the shell sections are initially in the form illustrated in FIG. 4. Thus, they may be all manufactured from the same mold. It is an important feature that these shells 12 are initially identical since the height of a particular cabana may be varied by adding or eliminating intermediate sections 16 as in FIGS. 1 and 2. Using identical sections also reduces the cost of tooling and preparing molds.

After the shells 12 have been molded in the form shown in FIG. 4, they are selectively cut to form the individual top, intermediate, and bottom shell sections. With reference to FIG. 5, it is seen that the dome 40 may be removed by cutting through a plane indicated at 54. By removing the dome 40, the remaining portion of the shell section 12 becomes a bottom shell section 18 as in FIGS. 1 and 2. Vents 44 are formed in the side walls of the bottom section 18.

Another shell may have its base flange 50 removed by a cut through the plane indicated at 56 in FIG. 5. The resulting shell becomes a top section 14 as FIGS. 1 and 2.

Additional shells 12 may have both the dome 40 and the base flange 50 removed by making cuts through both planes 54 and 56. This results in intermediate shell sections 16 as in FIGS. 1 and 2.

Once the desired number of shell sections, top, bottom and intermediate, have been cut, the sections are stacked in substantial vertical alignment with the side wall 42 of a given section extending into the bell-like enlarged lower end 48 of the section immediately thereabove. As illustrated in FIG. 5, rivets 58 may be utilized to secure each bell-like lower end 48 to the side wall 42 stacked therein.

The bell-like lower end 48 acts as a surface through which the rivets may pass and further acts as a louver to prevent water from passing through the vents 44 in the bottom section. This keeps moisture out of the holding tank while permitting continuous ventilation.

After the shell sections are stacked with their side walls 42 in substantial vertical alignment, the door frame 24 may be inserted into the cut-out 22 and attached to the flange 46 such as by riveting or the like. Then the door 26 is secured to the frame.

The parts forming the cabana may be shipped from the manufacturing plant to local service centers, for assembly of the unit and then local transportation to the site of use. Alternatively, the parts may be shipped to and assembled at the site of use, as for example, at a construction site. so little equipment is necessary for such assembly, such as riveting tools, that such equipment is readily available at most construction sites.

Once the wall sections have been fastened together, the base flange 50 of the bottom section 18 may be secured to a base skid 20 such as by having bolts in the skid which extend upward through the holes 52. Alternatively, bolts may be inserted downward through the holes 52 into the base skid.

FIGS. 9 and 10 illustrate a base skid formed of a metal or plastic pan 60 having runners 62 thereunder to form a supporting surface, which rests upon the ground, and having a front portion 64 which is raised to support the floor. The base skid 20 also includes a depression 66 to support the chemical tank 34 when the entire cabana is assembled. Also illustrated are bolts 68 extending upwardly from the base skid.

Since the base skid is initially separate from the cabana, a plurality of base skids may be nested together for shipment. The area above the runners 62 of the skid may be filled with a stone aggregate material 70 to add weight and stability to the skid. Then, a material such as high density polyurethane or a rigid thermosetting polystyrene 72 may be foamed over the skid to provide a finished surface in all areas. This foamed material provides a finished surface for the interior support of the cabana floor.

FIG. 11 illustrates another embodiment of the skid 20 including a pan 60 with runners 62 and having internal front and rear raised projections 74, 76 with a space 78 therebetween. The rear projection 76 includes a depressed area 66 to receive the chemical holding tank 34. In this embodiment, the area of the pan above the runners 62 and the area surrounding the projections 74, 76, including space 78, may be filled with stone aggregate or cement to add bottom weight for stability. Then a covering, such as plastic, is placed over the top of the skid and tank to support the seat 30. Again, the empty skids may be nested together for shipping purposes.

It should be understood that the concepts of the present invention are not restricted to the manufacture of a chemical toilet cabana but may be utilized for any enclosure wherein it is desired to manufacture the enclosure of a plurality of sections which are initially identical and which may be modified slightly to fit one within the other to comprise top, intermediate and base sections. The enclosure may be shipped in a knockdown form to be assembled at the place of use and at that time attached to a base skid which provides the stability necessary such as to withstand the force of wind at outdoor construction areas.

The invention may be further developed within the scope of the following claims. Accordingly, the foregoing description should be read only as illustrative of an operative embodiment of this invention and not in a limited sense.

I claim:

1. A method of making a portable enclosure comprising the steps of:
   forming at least two identical shell sections, each having a dome-like roof, a side wall terminating in a bell-like enlarged lower end, and a base flange extending outwardly from the lower end of said side wall;
   removing the base flange from a first section to form a shell top;
   removing the dome-like roof from a second section to form a shell bottom; and
   stacking said first section on said second section with the wall of said second section fitting within the enlarged lower end of said first section, and with the walls of said first and second sections being substantially in vertical alignment,
   whereby said enlarged lower end serves as a louver to restrict moisture from entering said shell bottom.

2. The method of claim 1 and further including the step of:
   fastening the base flange of said second section to a base skid, said skid adapted to receive a chemical toilet or the like positioned to extend upwardly into and interiorly of said second section.

3. The method of claim 1 and further including:
   forming at least three identical shell sections;
   removing both said dome-like roof and said base flange from a third section;
   stacking said sections so that said first section is on top, said second section is on the bottom and said third section is between said first and second sections, the walls of each section fitting within the enlarged lower end of the section above and with all the walls substantially vertically aligned.

4. The method of claim 3 wherein each of said sections includes a cut-out to receive a door frame, and including the steps of:
   attaching a door frame to said sections at said cut-out areas to vertically span said sections; and
   securing a door to said frame.

5. The method of claim 2 and further including the step of:
   filling said base skid with a heavy filler material prior to the step of fastening the second section to the base skid for increasing the stability of the assembled enclosure.

* * * * *